United States Patent [19]

Leroy

[11] Patent Number: 5,126,640
[45] Date of Patent: Jun. 30, 1992

[54] CENTRALIZED CONTROL UNIT FOR A VEHICLE SEAT

[75] Inventor: Yannick Leroy, Flers, France

[73] Assignee: Bertrand Faure Automobile, Bois d'Arcy, France

[21] Appl. No.: 729,408

[22] Filed: Jul. 12, 1991

[30] Foreign Application Priority Data

Jul. 12, 1990 [FR] France ............... 90 08881

[51] Int. Cl.⁵ .................. H02P 1/54; H01H 19/58
[52] U.S. Cl. ........................... 318/34; 318/54; 318/103; 200/11 TW
[58] Field of Search ............ 318/34, 49, 51, 53, 318/54, 65, 103, 112; 200/11 TW

[56] References Cited

U.S. PATENT DOCUMENTS 4,503,504  3/1985  Suzumura et al. ............ 364/424.05
4,698,571  10/1987  Mizuta et al. .................. 318/568
4,701,629  10/1987  Citroen ........................... 307/10.1
4,733,145  3/1988  Ohashi et al. ................... 318/54
5,019,759  5/1991  Takemura et al. ............... 318/466

Primary Examiner—Bentsu Ro
Attorney, Agent, or Firm—Robert W. Becker & Associates

[57] ABSTRACT

A centralized control unit that includes supply circuits for supplying various motors for controlling movements of parts of a vehicle seat, an in-board power source for feeding the supply circuits, an inverting device for enabling a control with inversion in a rotation direction of the various motors, and a study carrying wheel having a set of studs for enabling a selection of each of the various motors, with each of the set of studs being connected to a circuit of one of the various motors for controlling one of the parts of the seat.

5 Claims, 2 Drawing Sheets

CENTRALIZED CONTROL UNIT FOR A VEHICLE SEAT

BACKGROUND OF THE INVENTION

The present invention relates to a control unit for controlling the position of various elements forming a vehicle seat, in particular an automobile vehicle seat.

It should be noted in this respect that seats for today's tourism vehicles or trucks must generally comprise the following adjustments:

a) front-to-rear longitudinal adjustment of the seat portion;
b) front-to-rear adjustment of the under-thigh cushion;
c) top-to-bottom adjustment of the seat trim;
d) angular adjustment in inclination of the back portion of the seat;
e) top-to-bottom adjustment in length of the back portion of the seat;
f) adjustment of the lumbar cushion part;
g) adjustment in inclination of the head cushion by a simple or double movement; and
h) various other adjusting elements for adjustment of the back portion of the seat.

These adjustments or movements are effected by various mechanisms operated by separate electric or other motors. Separate motors make it necessary to use a plurality of electric circuits or the like which have to operate independently of one another.

Up to now, the seat was provided with an operator panel comprising as many switches as the number of necessary electric, hydraulic or pneumatic circuits; it was necessary for the seat user to make a time consuming and sometimes difficult adjustment. Moreover, the corresponding unit was costly and cumbersome.

It is therefore an object of the present invention to remedy the above drawback by providing a control unit for adjusting the position of various elements that form the vehicle seat.

Another object of the invention relates to the fact that the control unit can be provided with a memory means enabling it to keep in memory various adjustments for a given user, which means that, when the user takes a seat in the vehicle, he or she can in a very short time obtain the position of the various elements of the seat as previously chosen by him or her. Moreover, the top part of the control unit can be provided with a keyboard having a set of keys enabling, after adjustment of the seat, a memorization of the position chosen by the user.

The invention is also extended to a control unit that makes it possible to control the heating of the seating member of the seat in case of need.

Summary of the Invention

According to one feature of the invention, the control unit is for example placed on one side of a seat, this control unit containing supplying circuits for supplying various motors that control movements of parts of the seat, these supplying circuits being fed from an in-board power source. An inverting device is provided to enable a control with inversion of rotary direction of the various motors. Also provided is a stud carrying wheel having a set of studs for enabling a selection of each of the various motors, each of these studs being connected to a circuit of a motor controlling one of the parts of the seat.

According to another feature of the invention, the stud carrying wheel is fixed to an indexing device, this indexing device being placed in front of a window in order to call the circuit corresponding to an adjustment of one of the parts of the seat.

Various other features of the invention will be described in greater detail in the following disclosure.

BRIEF DESCRIPTION OF THE DRAWINGS

An embodiment of the invention is shown as a non-limiting example in the accompanying drawings, wherein.

DETAIL DESCRIPTION OF THE PREFERRED EMBODIMENT

Figure 1:
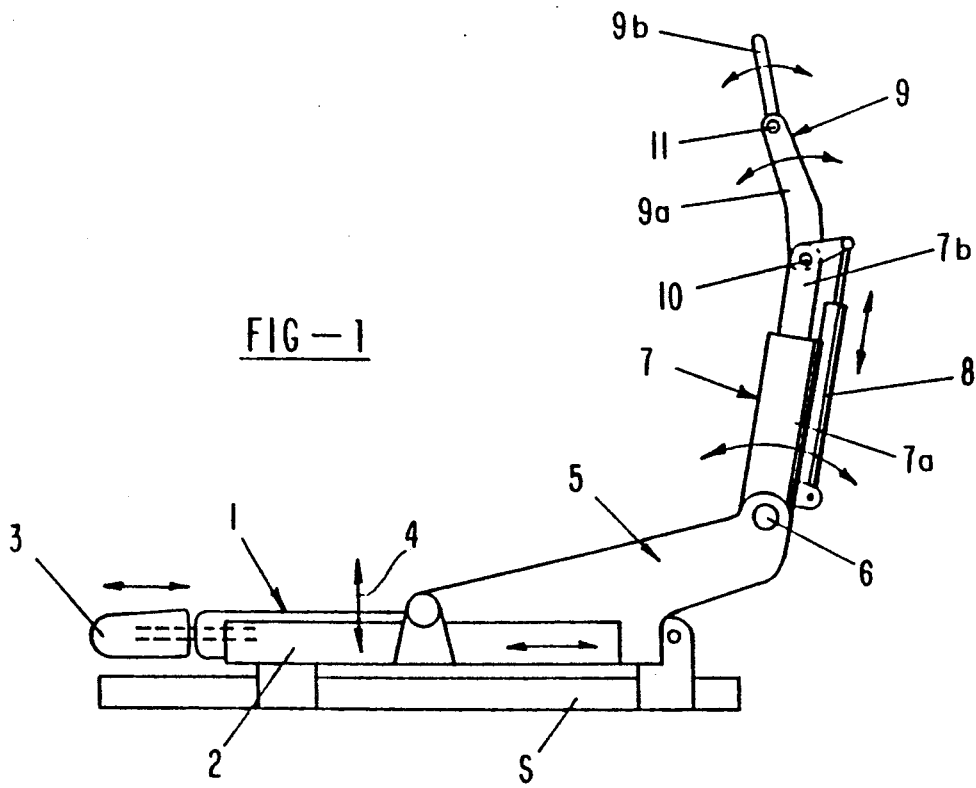
FIG. 1 is a diagrammatic side view of an adjustable seat controlled by a control unit according to the invention.

Referring now to the drawings in detail, FIG. 1 diagrammatically shows a seat having a sitting portion 1 on which is mounted one or two slide members 2 that are provided for the front to rear sliding of the sitting portion 1. The slide members 2 are supported by the base S of the car body.

Moreover, the armature of the sitting portion 1 comprises an under-thigh cushion 3 which may be moved from front to rear or from rear to front according to the position which is desired by the user. It is even possible, in some cases, that the above movement will allow either a raising or lowering of the under-thigh cushion 3 in order to better maintain the knees of the passenger.

A mechanism 4 for raising the sitting portion 1 is also provided between the slide members 2 of the seat and the armature of the sitting portion 1, in order to adjust in a vertical plane the position of the sitting portion 1 either from front to rear or from rear to front.

The armature of the sitting portion 1 is extended at its rear part by an angular armature 5 that at an upper point 6, either on one side or on both sides of the seat, has one or two articulation mechanisms for a back portion 7 of the seat. The articulation mechanisms placed on the point 6 enable an inclination adjustment from front to rear and from rear to front, and even in some cases a positioning of the back portion 7 as an extension of the sitting portion for making a berth.

In the present embodiment, the back portion 7 comprises a fixed lower part 7a and a movable upper part 7b. The movable upper part 7b is vertically movable by means of a mechanism 8 that can be either a double action cylinder, or a standing bolt and screw mechanism having another screw which is rotatable in order to extend or reduce the length of the mother screw, thereby adjusting the height of the back portion of the seat which obviously comprises two superimposed cushions, namely a lower fixed cushion and an upper movable cushion.

In some cases, it is also possible to increase or decrease the curvature in the vertical direction of the lower cushion of the back portion of the seat in order to better maintain the passenger's back.

Finally, it should be noted that FIG. 1 shows a head support 9 that comprises two superimposed elements 9a, 9b which can be independently adjusted in inclination by mechanisms 10, 11 that are mounted at a free end of the movable upper part 7b of the back portion 7 of the seat. The head support 9 can therefore assume the position desired by the passenger-user who has, therefore, the neck and head suitably supported, thereby obviating any weariness and ensuring to him or her a suitable support of the top part of the spinal column (cervical vertebrae), as well as the rear part of the head, which is particularly important in case of an accident.

The various mechanisms as above described are all operated by electric, hydraulic or pneumatic motors in order to define the better position of the various parts of a seat for a given user.

Figure 2:
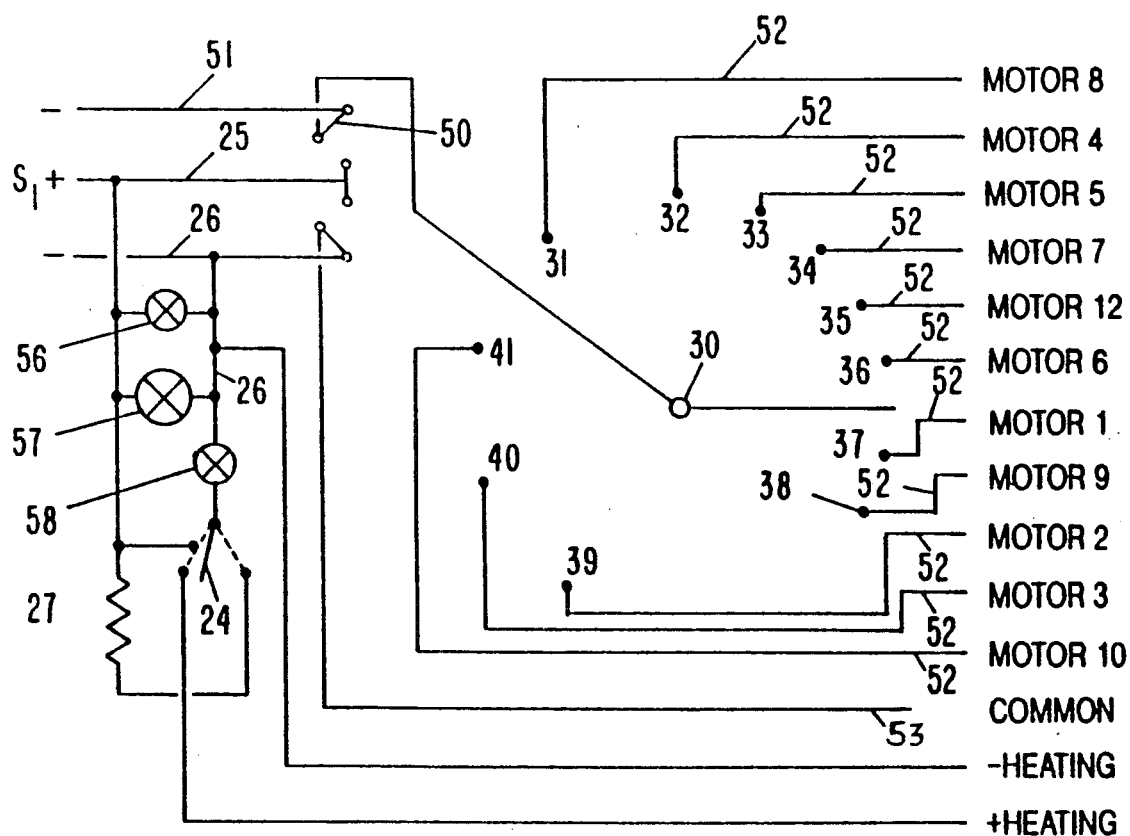
FIG. 2 is a block diagram of the control unit.

The adjustment can therefore be made, according to the invention, by means of a control unit diagrammatized in FIG. 2.

Figure 3:
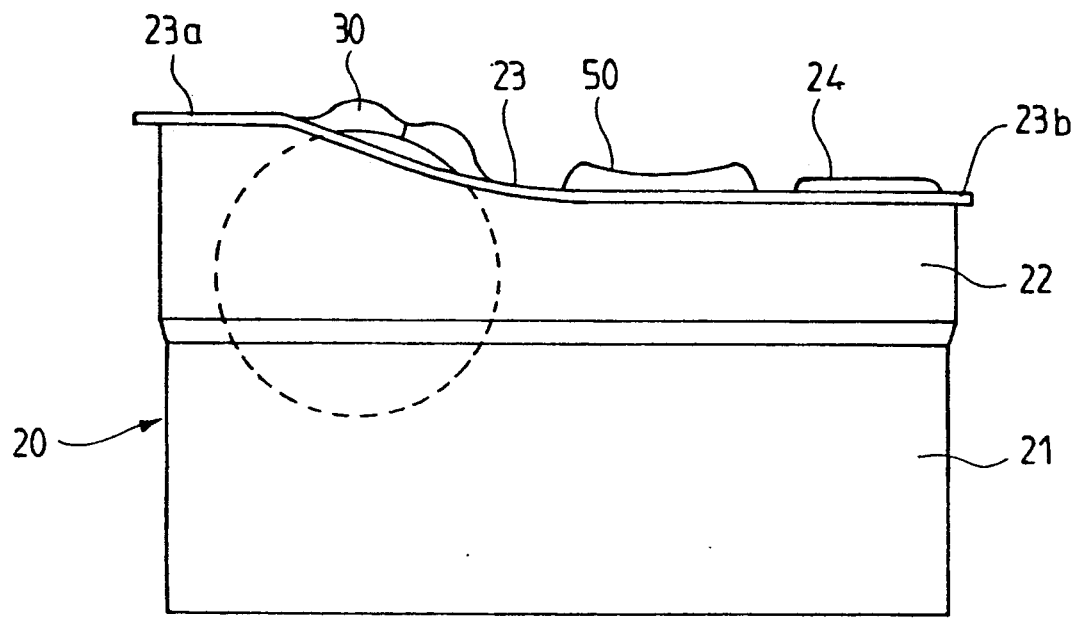
FIG. 3 is a side elevation view of the control unit.

As better shown in FIG. 3, the control unit of this invention is mounted in a box 20 comprising a lower part 21 of a rectangular parallelepipedal shape topped by an upper part 22 which is longer and slightly wider. The upper part 22 is closed by a shaped cover 23, the part 23a of which is higher than in the part 23b.

The front part of the box 20 is provided with a stud carrying wheel 30 having on its periphery a plurality of contact studs 31, 32, 33, 34, 35, 36, 37, 38, 39, 40 and 41 (FIG. 2) that make it possible, from a push button 50 that is connected to a supplying circuit 25 26, 51 which is on-board the vehicle and comprises a power source S1, to electrically feed the various motors 1, 2, 3, 4, 5, 6, 7, 8, 9, 10 and 12 through the eleven lines 52 and the common line 53, with these motors acting on:

motor 1 : the longitudinal adjustment of the sitting portion 1 of the seat by means of the slide members 2;

motor 2 : the positioning of the under-thigh cushion 3;

motor 3 : the raising of the sitting portion 1 of the seat by means of the mechanism 4;

motor 4 : the inclination of the back portion 7 of the seat by means of the mechanisms 6;

motor 5 : the control of the mechanism 8 for raising or lowering the upper part 7b of the back member of the seat;

motor 6 : adjustment of the part of the lumbar cushion;

motor 7 : the control of the mechanisms 10, 11 for adjusting in inclination, from front to rear and from rear to front, the two parts 9a and 9b of the head support 9; and motors 8-10 and 12 : the various other adjusting elements of the back portion of the seat.

The box 20 can also comprise a second push button switch 24 that is connected to the supplying circuit 25, 26 and makes it possible, from the inboard power source S1, to electrically feed a resistance which is not shown but is designated by + and −, for heating the top part of the cushion of the sitting member of the seat.

The box 20 is also provided with control lamps: lamp 56 for lighting a window 61, lamp 57 for lighting the push-button switch 50, and lamp 58 for lighting the push-button switch 24. A resistor 27 enables a double intensity lighting of the lamps 56-58 depending upon whether the push-button switch 24 is active or not.

Figure 4:
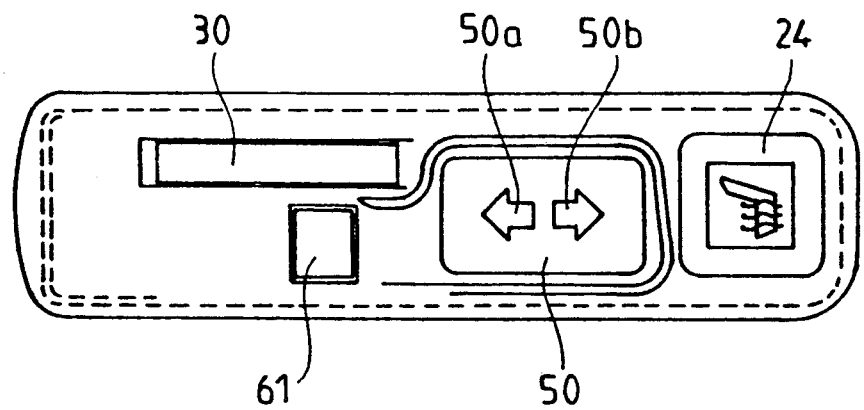
FIG. 4 is a top view of the control unit.

The push-button switch 50 is shown as an inverting switch and, according to its position either from 25 to 26 or from 25 to 51, each of the motors 1-10 and 12 is fed frontwardly or rearwardly to obtain a frontward or backward movement, and a frontward or rearward inclination, according to the parts of the seat to which the various motors are connected. It is the reason why, as shown in FIG. 4, the push-button switch 50 is provided with arrows 50a, 50b.

The stud carrying wheel 30, via a suitable reducing mechanism, at the same time causes a particular sign or figure to appear in front of the window 61 in the top part of the casing 20, which sign or figure corresponds to the circuit of the motor under consideration in order to enable the seat user to make the adjustment very often searched as a function of his or her morphology.

Finally, in some cases, the circuit of the push-button switch 50 is submitted through a suitable interface to the control of a memory member provided with a plurality of combinations A, B, C . . . etc., a given combination of which (for example A) may be called by means of a member, not shown, that is placed adjacent the push-button switch 50 and makes it possible, after a basic positioning adjustment, to memorize this adjustment.

Then, when, for example, the user of the combination A, corresponding to a positioning adjustment a of the seat, again uses the vehicle, the user does not have to make a new adjustment and only calls its personal code on the memory member. All the elements of the seat then again take their positions which have previously been chosen by the user. This is very important in particular for the driver's seat.

Since the memory member contains a plurality of combinations A, B, C . . . etc., it is possible for various people to use the vehicle by at each time adjusting the seat as a function of their will for ensuring maximum body comfort.

While in the above embodiment a given control unit is preferably provided for a given seat and in particular the driver's seat, a single control unit could be integrally provided for all of the seats of a vehicle, which seats will thus be controlled through this single control unit.

The present invention is, of course, in no way restricted to the specific disclosure of the specification and drawings, but also encompasses any modifications within the scope of the appended claims.

What I claim is:

1. A centralized control unit for a vehicle seat comprising:
   a plurality of supply circuits supplying electric power to a plurality of motors for controlling movements of a plurality of parts of the vehicle seat;
   an in-board power source for feeding said electrical power to said plurality of supply circuits;
   an inverting device for enabling inversion of rotational directions of said plurality of motors; and
   a stud carrying wheel having a set of studs for enabling a selection of each of said plurality of motors, each of said studs being connected to one of said supply circuits for a respective one of said plurality motors for controlling adjustment of a corresponding one of said parts of said seat.

2. A centralized control unit as set forth in claim 1, wherein said stud carrying wheel is fixed to an indexing device placed in front of a window of a box, for selecting a supply circuit corresponding to the adjustment of one of said parts of said seat.

3. A centralized control unit for a vehicle seat to enable an adjustment in a horizontal direction, an adjustment in a vertical direction, and an adjustment in inclination of various parts of said seat, comprising:
   i) a longitudinal adjustment of a sitting portion of said seat by means of slide members;
   ii) a vertical adjustment of said sitting portion of said seat by means of a trim adjustment device;

iii) means for adjusting an under-thigh cushion;
iv) means for adjusting a lower part of a back portion of said seat;
v) means for adjusting an upper part of said back portion of said seat; vi) means for adjusting inclination of a head cushion by one of a simple and double movement, said head cushion comprising at least one part;
vii) an adjustment in inclination of said head cushion by one of a simple and double movement;
vii) means for controlling other adjusting elements of said seat;
wherein said control unit has the shape of a box and is disposed on one of a part of said seat and a part of a car body of the vehicle, and includes supplying circuits for supplying power to various motors that control various adjustments of said seat; wherein said supplying circuits are fed by an in-board power source through an inverting device to enable control with inversion in a rotational direction of said various motors and via a stud carrying wheel to enable selection among said various motors, said stud carrying wheel being provided with studs, each of said studs is connected to one of said various motors for controlling one of said adjustments of said seat; and wherein said stud carrying wheel is fixed to an indexing device placed in front of a window of said box for selecting a circuit corresponding to one adjustment of said seat.

4. A centralized unit as set forth in claim 3, wherein a push-button switch is provided in said box for controlling a resistance for heating said sitting portion of the seat.

5. A centralized control unit as set forth in claim 3 further comprising:
an interface;
a memory means for storing position data of said seat for a given passenger; and
means for automatic adjustment of said seat for said passenger according to said stored position data.

* * * * *